(12) United States Patent
Chitnavis et al.

(10) Patent No.: US 9,771,501 B2
(45) Date of Patent: Sep. 26, 2017

(54) GALVANIZED METAL BONDING ADHESIVE FORMULATION AND PROCESS FOR THE USE THEREOF

(71) Applicant: Illinois Tool Works, Inc., Glenview, IL (US)

(72) Inventors: Nagesh Chitnavis, Andhra Pradesh (IN); Mona Kulkarni, Andhra Pradesh (IN); Subodh Deshpande, Andhra Pradesh (IN); Daniel K. Doe, Hyde Park, MA (US); Peter Carbutt, Groton, MA (US); Gregory Schulz, Reading, MA (US)

(73) Assignee: Illinois Tool Works, Inc., Glenview, IL (US)

( * ) Notice: Subject to any disclaimer, the term of this patent is extended or adjusted under 35 U.S.C. 154(b) by 495 days.

(21) Appl. No.: 14/103,517

(22) Filed: Dec. 11, 2013

(65) Prior Publication Data

US 2014/0231009 A1    Aug. 21, 2014

Related U.S. Application Data

(60) Provisional application No. 61/767,050, filed on Feb. 20, 2013.

(51) Int. Cl.
| | |
|---|---|
| *C09J 5/00* | (2006.01) |
| *C09J 147/00* | (2006.01) |
| *C09J 4/06* | (2006.01) |
| *C08F 222/10* | (2006.01) |
| *C08F 220/18* | (2006.01) |

(52) U.S. Cl.
CPC ........... *C09J 147/00* (2013.01); *C08F 220/18* (2013.01); *C09J 4/06* (2013.01); *C09J 5/00* (2013.01)

(58) Field of Classification Search
CPC .... C09J 147/00; C09J 5/00; C09J 4/06; C08F 222/10; C08F 220/18

USPC ................... 156/332; 427/207; 524/522, 147
See application file for complete search history.

(56) References Cited

U.S. PATENT DOCUMENTS

| | | | |
|---|---|---|---|
| 3,826,772 A * | 7/1974 | Gebhard | ............... C09J 115/02 156/333 |
| 5,376,746 A | 12/1994 | Skoultchi | |
| 6,989,416 B2 | 1/2006 | Wen et al. | |
| 7,060,327 B2 | 6/2006 | Xia et al. | |
| 7,408,012 B1 | 8/2008 | Kneafsey et al. | |
| 7,956,143 B1 * | 6/2011 | Xia | ........................ C09J 133/00 524/849 |
| 2004/0229990 A1 | 11/2004 | Righettini et al. | |
| 2006/0252866 A1 * | 11/2006 | Wang | ........................ C09J 4/00 524/379 |

FOREIGN PATENT DOCUMENTS

| | | |
|---|---|---|
| CN | 101189315 A | 5/2008 |
| CN | 101392153 A | 3/2009 |
| CN | 102115641 A | 7/2011 |
| CN | 102816534 A | 12/2012 |
| EP | 1424378 A2 | 6/2004 |

* cited by examiner

*Primary Examiner* — Deve E Valdez
(74) *Attorney, Agent, or Firm* — Avery N. Goldstein; Blue Filament Law PLLC

(57) ABSTRACT

A two-part adhesive formulation is provided that has an adhesive part A and an activator part B. The part A includes a monomer amount of a methacrylate ester monomer, a crosslinker amount of a polyfunctional monomer, an antioxidant, a free-radical polymerization inhibitor, and an adhesion promoter system to improve cured adhesive strength to a substrate, an impact modifier and a toughening agent and a free-radical polymerization initiator. The part B includes an impact modifier, butyl rubber, methacrylate ester monomer, and a free-radical polymerization accelerator yet varies in the weight ratio used relative to part A. Each of the part A and the part B have separate storage stability of at least 300 days at 23° C. A process of applying an adhesive to a substrate is provided that includes combining together parts A and B to form an adhesive mixture and applying the mixture to the substrate and allowed to cure.

21 Claims, No Drawings

GALVANIZED METAL BONDING ADHESIVE FORMULATION AND PROCESS FOR THE USE THEREOF

CROSS-REFERENCE TO RELATED APPLICATION

This application claims priority of U.S. Provisional Patent Application Ser. No. 61/767,050 filed Feb. 20, 2013, which is incorporated herein by reference.

FIELD OF THE INVENTION

The present invention in general relates to adhesives and in particular to free-radical curing adhesives able to adhere to a variety of metal substrates and having a shelf stability of more than 300 days at 23° C.

BACKGROUND OF THE INVENTION

In many industries, manufacturers of metal components have changed to structural adhesives to replace conventional fastening techniques such as rivets, bolts, and welding. Adhesives in theory offer many attractive properties that include improved product performance, aesthetics, reduced overall assembly time, and lower production costs. Additionally, adhesives preclude much of the stress point concentration, corrosion, and component damage often seen with rivets, bolts, welding, and other traditional fastening methodologies.

While conventional structural adhesives have made considerable progress in being able to bond a variety of substrates such as aluminum, cold-rolled steel, and carbon steel, conventional adhesives to cover a loss of strength over time on galvanized steel substrates. As a result of conventional structural adhesives failure to retain strength on galvanized substrates, various industries reliant on galvanized materials have retained traditional joinders such as welding and mechanical fasteners while suffering all the known limitations of these traditional processes.

Adhesive joinder of metal components has met with limited acceptance in various industries due to poor adhesion strength at elevated temperatures of 50° C., as well as low impact and yield strengths at −40° C. Additionally, conventional metal substrate joining adhesives tend to have inadequate shelf lives of six months or less at 20° C. Still further limitations of existing structural adhesives include low terminal lap shear strength and a slow build in handling strength that results in long fixture times that are contrary to efficient manufacturing throughput.

Thus, there exists a need for a structural adhesive formulation with improved adhesion at elevated temperature while offering a longer shelf life and superior thermal stability. There further exists a need for such an adhesive formulation offering a more rapid build of handling strength and a higher terminal lap shear strength even at reduced temperature so as to yield an adhesive able to bond a variety of structural substrates including galvanized metal.

SUMMARY OF THE INVENTION

A two-part adhesive formulation is provided that has an adhesive part A and an activator part B. The part A includes a monomer amount of a methacrylate ester monomer, a crosslinker amount of a polyfunctional monomer, a toughening agent, an impact modifier, an anti-oxidant, a free-radical polymerization inhibitor, and an adhesion promoter system to improve cured adhesive strength to a substrate, and a free-radical polymerization initiator. The part B includes an activator monomer amount of the methacrylate ester monomer, and a free-radical polymerization accelerator and an impact modifier when the weight ratio the adhesive part A to activator part B is present in a 1:1 weight ratio. Each of the part A and the part B have separate storage stability of at least 300 days at 23° C. When the weight ratio of the adhesive part A to activator part B are present in a 10:1 weight ratio, the activator part B includes an butyl rubber, a thixotropic agent, and a free-radical polymerization accelerator; while retaining the property of storage stability of at least 300 days at 23° C.

A process of applying an adhesive to a substrate is provided that includes combining together the parts A and B to form an adhesive mixture. The adhesive mixture is then applied to the substrate and allowed to cure.

DETAILED DESCRIPTION OF THE INVENTION

The present invention has utility as a curing adhesive particularly well suited for bonding structural substrates. Structural substrates operatively bonded by an inventive adhesive illustratively include electro-galvanized steel, hot-dipped galvanized steel, cold-rolled steel, aluminum, aluminum alloys, acrylonitrile-butadiene-styrene (ABS), mild steel (MS), polyvinyl chloride (PVC), and fiberglass. An inventive adhesive formulation is appreciated to be operative to bond to like structural substrates, as well as to bond one such substrate to other substrates including other metals, other plastics, and to do so through a rapid handling strength during cure to facilitate handling and removal of fixturing devices in a manufacturing setting.

An inventive formulation is provided as a two part formulation that includes an adhesive part that is synonymously referred to herein as part A. The adhesive part of the formulation includes a polymerizable monomer component, elastic material, reacts with an activator part that is synonymously referred to herein as part B. The part B includes a rubber component and a polymerization accelerator. The following components of an inventive formulation are detailed as weight percentages of a formulated part A or part B inclusive all components except non-reactive diluents, and non-reactive components under cure conditions illustratively including curing agents, corrosion inhibitors, chain transfer agents, pigments, spacers, fragrances, fillers, and fire retardants.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

An adhesive Part A includes in an adhesive embodiment a majority by active weight percent of acrylate monomer, methacrylate monomer, or a combination thereof. In other embodiments of the present invention, such monomers represent at least 20 weight percent of an adhesive Part A (exclusive of non-reactive diluents). Acrylate monomers and methacrylate monomers operative in the present invention illustratively include methylmethacrylate, $C_1$-$C_{16}$malkylacrylate, $C_1$-$C_{16}$ alkyl methacrylate, $C_1$-$C_{16}$ hydroxyl alkylacrylates, $C_1$-$C_{16}$ primer amine acrylates, $C_1$-$C_{16}$ secondary amine acrylates, $C_1$-$C_{16}$acrylosulfonic acids, and epoxy $C_1$-$C_{16}$ acrylates or methacrylates. Specific acrylate and methacrylate monomers operative herein in addition to aforementioned methylmethacrylate include methylacrylate, ethylacrylate, ethylmethacrylate, isobornyl methacrylate, butylacrylate, octylacrylate, ethyl hexyl acrylates, ethyl hexyl methacrylates, dodecyl methacrylate, tetrahydrofurfuryl methacrylate, cyclohexyl methacrylate, 2-hydroxyl ethylacrylate, 2-hydroxyl methacrylate, 3-hydroxyl propylacrylate, 1-hydroxyl-2 amino propyl methacrylate, 1-amino-2-hydroxyl propyl methacrylate, acrylamide, 1-amino-3-hydroxy propyl methacrylate, 2-terbutyl amino ethyl methacrylate, 2-acrylamido-2-methyl propane sulfonic acid, glycidyl methacrylate.

An inventive formulation also includes a di-methacrylate monomer, a tri-methacrylate monomer, carboxylic acid analogs thereof, or a combination thereof. These monomers are synonymously referred to herein as polyfunctional monomers and illustratively a di- or tri-(meth)acrylate monomers, such as those selected from polyethylene glycol di(meth)acrylates, bisphenol-A di(meth)acrylates, tetrahydrofurane di(meth)acrylates, hexanediol di(meth)acrylates, polyethylene glycol di(meth)acrylates, such as triethylene glycol di(meth)acrylate, tripropylene glycol di(meth)acrylate, tetraethylene glycol di(meth)acrylate, diethylene glycol di(meth)acrylate, 1,4-butanediol di(meth)acrylate, 1,6-hexanediol di(meth)acrylate, pentaerythritol tetra(meth)acrylate, trimethylol propane tri(meth)acrylate, trimethylol propane tri(meth)acrylate, di-pentaerythritolmonohydroxypenta(meth)acrylate, pentaerythritol tri(meth)acrylate, ethoxylated bisphenol-A di(meth)acrylate, ethoxylatedtrimethylol propane tri(meth)acrylates, trimethylolpropanepropoxylate tri(meth)acrylates, or combinations thereof; and other such monomers as detailed in U.S. Pat. Nos. 7,408,012; and 5,376,746. In those embodiments of the present invention containing polyfunctional monomers, the polyfunctional monomer is typically present on a mole ratio relative to the aforementioned acrylate monomers of 0.001-0.5:1 with the ratio modifying the average chain length between cross linkages.

It is appreciated that the methacrylate ester monomer is present solely in adhesive part A in some embodiments while in other embodiments methacrylate ester monomer is present in both parts A and B of an inventive formulation. An inventive formulation includes a quantity of a butyl rubber component present in quantities to promote a cohesive failure mode. Without intending to be bound by a particular theory, it is believed that crack propagation of a cured inventive adhesive is inhibited by the presence of such rubber domains thereby changing the failure mode of the resultant adhesive. In specific embodiments of the present invention in which parts A and B are present in a 10:1 ratio, the butyl rubber is present in both the adhesive part as well as the activator part while in other inventive embodiments, the butyl rubber is segregated to only one of these two inventive formulation parts. As used herein, the term butyl rubber is intended to encompass SB rubber, isoprene rubber, polyisobutylene rubber, isobutylene Isoprene rubber, and combinations thereof.

An impact modifier operative herein illustratively includes methacrylate butadiene styrene, nitrile rubber, a block copolymer of styrene and butadiene, high rubber graft having 60 percent rubber, ABS, natural rubber, and combinations thereof. While the loading of an impact modifier depends on factors including weight ratio between adhesive part and activator part, impact modifier molecular weight, and impact modifier modulus. Typical impact modifier loadings in adhesive:activator weight ratio formulation range from 10 to 37 total weight percent for a 10:1 ratio formulation and from 12 to 50 total weight percent for a 1:1 ratio inventive formulation. In certain inventive embodiments, a butyl rubber is present as a rubber component in combination with the impact modifier. In still other embodiments, the butyl rubber is segregated into an activator, part B of an inventive formulation, yet still serves to modify the failure mode of the cured adhesive.

An inventive formulation also includes a toughening agent. A toughening agent is distinguished from rubber component in the present invention in having low Tg and can significantly improve the performance of cured adhesives at low temperatures such as −40° F. (−40° C.) and at the same time does not cause a negative impact on the performance of cured adhesives at elevated temperatures such as 180° F. whereas the rubber component used in this invention are the core-shell structured impact modifiers and provide not only excellent impact strength but also non-sag, excellent thixotropic property and improved anti-sliding performance. Toughening agents operative herein illustratively can be chosen from a wide variety of elastomeric materials that form discrete particles or biphasic domains in a continuous resin matrix. For example, pre-reacted particles of polyacrylate, styrene/butadiene/styrene (SBS) copolymers, styrene/isoprene/styrene (SIS) copolymers, styrene/butadiene (SBR) copolymers, as well as other pre-reacted materials may be added in particulate form to the resin composition. A partial listing of useful pre-reacted elastomer rubbers includes pre-reacted elastomer particles selected from the group consisting of acrylate-butadiene, butadiene, chloroprene, ethylene-propylene, ethylene-propylene-diene, isoprene, isobutylene, isobutylene-isoprene (butyl rubber), styrene-butadiene, styrene-isoprene, acrylonitrile-butadiene, acrylonitrile-chloroprene, vinylpyridine-butadiene, vinylpyridine-styrene-butadiene, carboxylic-styrene-butadiene, chloro -isobutylene-isoprene (chlorobutyl rubber), bromo-isobutylene-isoprene (bromobutyl rubber), dialkysiloxane, polypropylene oxide), polyester urethanes, polyether urethanes, and mixtures thereof. Moreover, reactive liquid polymers (RLP's) also can be incorporated as the toughening component. RLP's contain functional groups, usually on their terminal ends but occasionally as pendant groups, and react with the resin in situ to form elastomeric domains. Examples of RLP's include, without limitation, carboxyl-terminated butadiene nitrile (CTBN), amine-terminated butadiene nitrile (ATBN), hydroxyl-terminated butadiene nitrile (HTBN), epoxy-terminated butadiene nitrile (ETBN), mercapto-terminated butadiene nitrile (MTPN), and phenoxy-terminated butadiene nitrile (PTBN). In specific embodiments of the present invention, the toughening agent includes chloro-sulphonated polyethylene, neoprene, copolymers of ethylene acrylic elastomer, poly (methyl methacrylate)-grafted rubber, Styrene acrylonitrile copolymer or combinations thereof. It is appreciated that a toughening agent is present as a component of an adhesive part, an activator part, or both parts of an inventive formulation. In specific embodiments of the present invention, a toughening agent is present only in an adhesive part but it is appreciated that the amount of toughening agent present depends on characteristics of the toughening agent as well as the weight ratio between adhesive:activator parts, typical loadings of toughening agent in a fully formulated inventive adhesive range from 7-20 total weight percent for a 10:1 weight ratio formulation and 10-40total weight percent in a 1:1 adhesive:activator formulation.

In order to formulate an inventive adhesive formulation that achieves high strength without the need for a separate surface treatment prior to application of an inventive formulation, an adhesion promoter system is provided within an inventive formulation. The adhesion promoter system includes an etching agent and an adhesion promoter to facilitate adhesion of a fully cured formulation of various substrates including galvanized substrates. An adhesion promoter system is readily formulated into either an adhesive part, an activator part, or both parts of an inventive formulation. In specific embodiments, the adhesion promoter system is found only in the adhesive part. Specific adhesion promoters operated in an inventive formulation illustratively include phosphate esters, mono-functional phosphates, difunctional phosphates, and combinations thereof. Typical loadings of adhesion promoter in an inventive formulation are from 1 to 5 total weight percent of a fully formulated adhesive with the amount being largely independent of the weight ratio between adhesive part:activator part. Etching agents operative herein illustratively include inorganic acids such as sulfuric acid, nitric acid, hydrofluoric acid, hydrochloric acid, hydrobromic acid, perchloric acid, phosphoric acid, or monophosphate; and organic acids such as acetic acid, tannic acid or formic acid. Typical loadings of etching agent in an inventive formulation are from 0.2 to 1 total weight percent of a fully formulated adhesive with the amount being largely independent of the weight ratio between adhesive part:activator part.

A polymerization initiator present in an adhesive Part A is limited only by the desired kinetics of free-radical polymerization desired and compatibility with other inventive composition components. Initiators operative herein illustratively include tert-Butyl peroxylbenzoate, cumene hydroperoxide, tert-butyl hydroperoxide, and combinations thereof. Typical loadings of initiator in an inventive formulation are from 0.0001 to 2 total weight percent of a fully formulated adhesive.

A polymerization accelerator present in an activator Part B is limited only by the desired kinetics of free-radical polymerization desired and compatibility with other inventive composition components. Accelerators operative herein illustratively include tert-pyridine derivatives, butaraldehyde aniline condensate, N,N-dimethylaniline, N,N-dimethyltoludiene, N,N-diethyltoludiene, Copper acetyl acetonate (Metal acetyl acetonates), and combinations thereof. Typical loading of initiator in an inventive formulation is from 1 to 10 total weight percent of a fully formulated adhesive.

An inventive formulation in certain embodiments also includes various chelating agents, corrosion inhibitors, chain transfer agents, pigments, spacers, fragrances, fillers, fire retardants, and combinations thereof. Such additives are limited only by the requirement of compatibility with the other components of an inventive formulation. Such additives are provided to balance or otherwise modify at least one property of an inventive formulation as to handling, storage, cure rate, or adhesive properties. An inventive formulation in certain embodiments also includes various oxidizing agents, reducing agents, thickeners, pigments, thixotropic agents, plasticizers, antioxidants, fillers, and combinations thereof. Such additives are limited only by the requirement of compatibility with the other components of an inventive formulation. Such additives are provided to balance or otherwise modify at least one property of an inventive formulation as to handling, storage, cure rate, or adhesive properties. Typical components amounts for an inventive adhesive are provided in Tables 1A and 1B for parts A and B, respectively.

Tables 1A and 1B. Typical Component Amounts for Adhesive (Part A) and Activator (Part B), where Amounts are Given in Weight Percentages unless otherwise Noted:

TABLE 1A

| ADHESIVE (Part-A) | | |
|---|---|---|
| Component: | (10:1 Ratio) | (1:1 Ratio) |
| Methacrylate ester Monomer | 50-70% | 30-70% |
| Cross linker | 3-10% | 3-10% |
| Antioxidant | 0.5-2% | 0.5-2% |
| Inhibitor | 0.02-0.2% | 0.01-2.5% |
| Adhesion promoter | 1-5% | 1-5% |
| Etching agent | 0.2-1% | 0.2-1% |
| Toughening agent | 7-20% | 10-40% |
| Impact Modifiers | 10-30% | 10-30% |
| Initiator | 0.0001-2% | 0.0001-2% |
| Diluents/other additives | 0-remainder | 0-remainder |

| ACTIVATOR (Part B) | | |
|---|---|---|
| Component: | (10:1 Ratio) | (1:1 Ratio) |
| Methacrylate ester Monomer | Nil | 40-80% |
| Butyl rubber | 10-70% | 0-20% |
| Impact Modifiers | Nil | 10-40% |
| Accelerator | 20-80% | 2%-20% |
| Thixotropic agent | 2-10% | 0-5% |
| Diluents/other additives | 0-remainder | 0-remainder |

A process is provided for producing an adhesive formulation produced by free radical polymerization that bonds well to the aforementioned substrates. An inventive formulation is a two-part formulation that is either premixed to initiate a time period pot life, or alternatively the two parts are co-applied to a substrate under conditions for polymerization to occur between the various monomers. A pot life of 5 to 7 minutes is provided for in certain embodiments to achieve an adhesive product that has a rapid cure time and possesses superior thermal stability over a wide temperature range of −40° C.-120° C., as compared to preexisting adhesives. Additionally, the separate parts of an inventive formulation provide a shelf life of more than 300 days at 23° C. In specific inventive embodiments, polymerization occurs at 28° C. in ambient atmosphere on other embodiments, polymerization is initiated by energy inputs such as heating, ultraviolet radiation exposure or other free radical formation mechanisms. In certain inventive embodiments in which the adhesive part A, and activator, part B are present in a 1:1 weight ratio ±10%, storage stability of more than 300 days at 23° C. is obtained. This is in contrast to conventional adhesives that have working ratios of 10:1, 4:1, or 2:1 yet still are unable to achieve storage shelf life of more than six months under like storage conditions.

Regardless of the form of an inventive formulation, upon induction of pot life for the formulation, the formulation is present in simultaneous contact with two or more substrates with the substrates held in contact with the curing inventive formulation for an amount of time sufficient to achieve a bond between the substrates. While an inventive formulation is particularly well-suited for bonding galvanized substrates such electro galvanized to one another, substrates in simultaneous contact with a polymerizing inventive formulation need not be the same and an inventive formulation is also well-suited for joinder of other substrates illustratively including cold rolled steel, aluminum, PVC, ABS, mild steel, vinyl polymers, wood, and fiberglass. Two such substrates can be brought together to form various adjoined structures such as a lap joint, butt joint, corner joint, edge joint, and T-joint. In still other embodiments, an inventive formulation is applied to a single substrate and allowed to cure to form a coating that offers substrate protection or is operative as a primer for subsequent material applications. As an inventive formulation cures through a free-radical mechanism, an inventive formulation can be applied to a variety of thicknesses and still achieve polymerization throughout. Typical thicknesses of an inventive formulation between substrates range from 0.001-4 mm.

The present invention is further described with respect to the following non-limiting examples. These examples are intended to illustrate specific formulations according to the present invention and should not be construed as a limitation as to the scope of the present invention.

EXAMPLE 1

Compounding of Two-part Formulation

Adhesive part A is produced by mixing 51.9 g (grams) of methacrylate ester monomer, 4.5 g of methyl methaacrylic acid, 1.0 g of ditri-decyl-thiodipropioanate (DTDTDP), 2.0 g of butylated hydroxyl toluene with 0.03 g of benzoquinone in a reaction kettle equipped with a mechanical stirrer and nitrogen gas blanketing. The components are mixed under a nitrogen blanket for 15 minutes at room temperature under swirling conditions. 2.52 g of phosphate esters and 1.05 g of phosphoric acid are added to the mixture with stirring at 500 revolutions per minute (rpm) for 15 minutes. 7.5 g of chloro-sulphonated polyethylene and 10 g of SAN copolymer is added slowly to the mixture with stirring continuing for an additional 30 minutes until a homogeneous mixture is achieved. Stir speed is then raised to 800 rpm for ten minutes to assure homogeneity. 15 g of SBS and 3 g methacrylate butadiene styrene are added over a period of 10 minutes with stirring at 800 rpm. Thereafter, the mixture is allowed to rest for 2 hours under the nitrogen blanket without agitation. Thereafter, the mass is stirred for 30 minutes at 1,000 rpm and stirrer speed is reduced to 200 rpm. 1.5 g of t-butyl peroxylbenzoate is added drop wise to the reaction mass with stirring continuing at 200 rpm. The reaction kettle is then evacuated for 20 minutes under vacuum of 600 mmHg to degas the adhesive part A. The resultant adhesive part A is packed under a nitrogen atmosphere to achieve a storage stability of more than one year at 23° C.

Activator part B is produced by adding together 70 g of butyl rubber and 25 g of butaraldehyde aniline condensate and 0.005 g of metal acetyl acetonate in a reaction kettle equipped with a mechanical stirrer and nitrogen gas blanketing equipment. The components are mixed for 20 minutes at room temperature with the stirrer operating to achieve swirling. And 4.995 g of (fumed silica thixotropic agent) are added to the mixture with stirring for 60 minutes at 1,000 rpm to achieve homogeneity. The reaction kettle is evacuated for 20 minutes under a vacuum of 600 mm Hg to degas the activator part B. The activator part B is then packed under a nitrogen atmosphere to achieve storage stability of more than 1 year at 23° C.

Part A and part B are combined in weight ratios of 10:1±10% and used in subsequent testing.

EXAMPLE 2

Thermal Stability Testing

1:1 system: Uncured samples are kept at 50°±1° C. for 28 days and observed to change in viscosity by less than 40% relative to initial viscosity. Pot life, mechanical strength, and bonding capability to galvanized surfaces and rate of strength development for the resulting adhesive remained within 85% relative to initially formulated samples showing two substrates during the test period. Further, product performance and lap shear strength are found to be within 80% even after aging the samples at 50° C. for 28 days.

10:1 system: Uncured samples are kept at 50°±1° C. for 28 days and observed to change in viscosity by less than 40% relative to initial viscosity. Pot life, mechanical strength, and bonding capability to galvanized surfaces and rate of strength development for the resulting adhesive remained within 85% relative to initially formulated samples showing two substrates during the test period. Further, product performance and lap shear strength are found to be within 80% even after aging the samples at 50° C. for 28 days.

Uncured samples of the 10:1 system parts A and B are also kept at 60±1° C. for 5 days and observed to change in viscosity by less than 40% relative to initial viscosity. Mechanical properties and cure profiles also remained within 85% relative to initially formulated samples. This data is extrapolated with conventional models to a shelf life of 23° C. of at least 300 days (10 months).

EXAMPLE 3

Properties of Inventive Formulations

The various properties of inventive formulations are provided in Table 2 for the part A and part B of example 1 with the respective methodology used for determining properties of a fully cured adhesive so formed along with the respective values.

Duplicate lap joints are formed between strips of various substrates as noted in Table 2 with the substrate strips having a thickness of 1.6 mm and an adhesive thickness of between 0.03 and 0.06 mm curing at a temperature of 23.5° C. Surface preparation prior to application is performed with an isopropanol wipe. The strip dimensions are 101.6 mm×25.4 mm×1.6 mm with an overlap of 25.4 mm×12.5 mm, with a ramp rate of 1.3 mm per minute. The strips are coated with a formulation of example 1 at either 10:1 or 1:1 ratios between adhesive part A:activator part B.

TABLE 2

Properties of inventive formulation and resultant fully cured adhesive.

| Properties | Method | Adhesive of present invention |
|---|---|---|
| Appearance, Part A | — | Off White |
| Part B | | Yellow |
| Mix Ratio | — | 10:1/1:1 |
| Lap Shear Strength at 73° F., psi | ASTM D1002 | 1200~1500 psi |

TABLE 2-continued

Properties of inventive formulation and resultant fully cured adhesive.

| Properties | Method | Adhesive of present invention |
|---|---|---|
| Substrate: Electro-Galvanized steel, Z-70 Lap Shear Strength at 73° F., psi | ASTM D1002 | 1200~1500 psi |
| Substrate: Hot-dipped Galvanized steel, HDG-G90 Lap Shear Strength at 73° F., psi | ASTM D1002 | 1500~1800 psi |
| Substrate: Cold Rolled Steel Lap Shear Strength at 73° F., psi | ASTM D1002 | 2000~2400 psi |
| Substrate: Grit-Blasted Mild Steel Lap Shear Strength at 73° F., psi | ASTM D1002 | 1200~1600 psi |
| Substrate: Aluminum Lap Shear Strength at 180° F., psi | ASTM D1002 | 1600~2000 psi |
| Substrate: Hot-dipped Galvanized steel, HDG-G90 Lap Shear Strength at 250° F., psi | ASTM D1002 | 900~1300 psi |
| Substrate: Hot-dipped galvanized steel, HDG-G90 | | |

Lap joints of Example 3 are repeated with comparative conventional adhesives noted herein as reference 1 and reference 2 that are beyond the inventive formulation compositions. The properties for these comparative examples are provided in Table 3 along with data from the above Table 2 for an inventive 10:1 formulation.

TABLE 3

Comparative properties of inventive adhesion and reference conventional adhesives.

| Properties | Method | Reference 1 | Reference 2 | Adhesive of present invention |
|---|---|---|---|---|
| Appearance, Part A | — | Straw | Off White to Tan | Off White |
| Part B | | White/Black | Gray paste | Yellow |
| Mix Ratio | — | 10:1 | 4:1 | 10:1 |
| Open Time/Work Time at 23° c. | — | 5-8 min | 6-9 min | 5-7 min |
| Peak Exotherm, 10 gm mass | — | 15-20 min | 22 min | 10~15 min |
| Lap Shear Strength, psi Substrate: Galvanized steel | ASTM D1002 | 1250 psi | 1200 psi | 1200~1500 psi |
| Lap Shear Strength, psi Substrate: Cold Rolled Steel | ASTM D1002 | 1800 psi | 1760 psi | 1500~1800 psi |
| Lap Shear Strength, psi Substrate: Grit Blasted Mild Steel | ASTM D1002 | 1600 psi | 1550 psi | 2000~2400 psi |
| Lap Shear Strength, psi Substrate: Aluminum | ASTM D1002 | 1300 psi | 1200 psi | 1200~1600 psi |

Patents and references cited in the above application are indicative of the skill in the art. Each of these patents and references is hereby incorporated by reference to the same extent as if each reference was individually incorporated by reference.

The invention claimed is:

1. A curable two-part methacrylate based structural adhesive composition for bonding galvanized metal sheets comprising:
   an adhesive part A comprising:
      a monomer amount of a methacrylate ester monomer, said methacrylate ester monomer is selected from the group consisting of: methylmethacrylate, methylacrylate, ethylacrylate, ethylmethacrylate, isobornyl methacrylate, butylacrylate, octylacrylate, ethyl hexyl acrylates, ethyl hexyl methacrylates, dodecyl methacrylate, tetrahydrofurfuryl methacrylate, cyclohexyl methacrylate, 2-hydroxyl ethylacrylate, 2-hydroxyl methacrylate, 3-hydroxyl propylacrylate, 1-hydroxyl-2 amino propyl methacrylate, 1-amino-2-hydroxyl propyl methacrylate, acrylamide, 1-amino-3-hydroxy propyl methacrylate, 2-terbutyl amino ethyl methacrylate, 2-acrylamido-2-methyl propane sulfonic acid, and glycidyl methacrylate;
      a crosslinker amount of a polyfunctional monomer;
      an anti-oxidant;
      a free-radical polymerization inhibitor;
      an adhesion promoter system to improve cured adhesive strength to a substrate;
      a free-radical polymerization initiator;
      a first impact modifier; and
      a toughening agent; and
   an activator part B present in a 1:1 weight ratio to said part A,
   said part B comprising:
      an activator monomer amount of said methacrylate ester monomer;
      a second impact modifier;
      a butyl rubber present as a rubber component in combination with the second impact modifier;
      a free-radical polymerization accelerator;
   each of said part A and said part B having separate storage stability of at least 300 days at 23° C.; and
   wherein the composition achieves cohesive failure mode without the use of a primer.

2. The composition of claim 1 wherein said methacrylate ester monomer constitutes 35 to 75 percent by weight of the adhesive part A formulation.

3. The composition of claim 1 wherein said polyfunctional monomer and said methacrylate ester monomer are present in a molar ratio of 0.01-0.02:1.

4. The composition of claim 1 wherein said first impact modifier and said second impact modifiers are each independently at least one of methacrylate butadiene styrene, nitrile rubber, a block copolymer of styrene and butadiene, high rubber graft, or a combination thereof; and said toughening agent comprises at least one of copolymers of ethylene acrylic elastomer, chloro-sulphonated polyethylene, poly (methyl methacrylate) grafted rubber, neoprene, styrene acrylonitrile copolymer, or a combination thereof.

5. The composition of claim 1 wherein said methacrylate ester monomer is at least one of methylacrylate, ethylacrylate, ethylmethacrylate, isobornyl methacrylate, butylacrylate, octylacrylate, ethyl hexyl acrylates, ethyl hexyl methacrylates, dodecyl methacrylate, tetrahydrofurfuryl methacrylate, or a combination thereof.

6. The composition of claim 1 wherein said adhesion promoter system comprises an adhesion promoter of a phosphate ester, a monofunctional phosphate, a difunctional phosphate, or a combination thereof; and an etching agent of an acid reactive towards a galvanized coating.

7. The composition of claim 1 wherein said activator part B further comprises a thixotropic agent.

8. The composition of claim 1 further comprising at least one of a chelating agent, corrosion inhibitor, chain transfer agent, pigment, spacer, fragrance, filler, fire retardant, or diluent.

9. A two-part adhesive formulation comprising:
an adhesive part A comprising:
a monomer amount of a methacrylate ester monomer;
a crosslinker amount of a polyfunctional monomer, said polyfunctional monomer is selected from the group consisting of: polyethylene glycol di(meth)acrylates, bisphenol-A di(meth)acrylates, tetrahydrofurane di(meth)acrylates, hexanediol di(meth)acrylates, polythylene glycol di(meth)acrylates, such as triethylene glycol di(meth)acrylate, tripropylene glycol di(meth) acrylate, tetraethylene glycol di(meth)acrylate, diethylene glycol di(meth)acrylate, 1,4-butanediol di(meth) acrylate, 1,6-hexanediol di(meth)acrylate, pentaerythritol tetra(meth)acrylate, trimethylol propane tri(meth)acrylate, trimethylol propane tri(meth) acrylate, di-pentaerythritolmonohydroxypenta(meth) acrylate, pentaerythritol tri(meth)acrylate, ethoxylated bisphenol-A di(meth)acrylate, ethoxylatedtrimethylol propane tri(meth)acrylates, trimethylolpropanepropoxylate tri(meth)acrylates, and combinations thereof;
an anti-oxidant;
a free-radical polymerization inhibitor;
an adhesion promoter system to improve cured adhesive strength to a galvanized steel substrate;
a free-radical polymerization initiator;
a first impact modifier; and
a toughening agent; and
an activator part B present in a 10:1 weight ratio to said part A,
said part B comprising:
a butyl rubber present as a rubber component in combination with a second impact modifier;
a free-radical polymerization accelerator; and
a thixotropic agent;
each of said part A and said part B having separate storage stability of at least 300 days at 23° C.

10. The formulation of claim 9 wherein said methacrylate ester monomer constitutes 35 to 75 percent by weight of the adhesive part A formulation.

11. The formulation of claim 9 wherein said polyfunctional monomer amount and said methacrylate ester monomer are present in a molar ratio of 0.01-0.02:1.

12. The formulation of claim 9 wherein said first impact modifier and said second impact modifiers are each independently at least one of methacrylate butadiene styrene, nitrile rubber, a block copolymer of styrene and butadiene, high rubber graft, or a combination thereof; and said toughening agent comprises at least one of copolymers of ethylene acrylic elastomer, chloro-sulphonated polyethylene, poly (methyl methacrylate) grafted rubber, neoprene, styrene acrylonitrile copolymer, or a combination thereof.

13. The formulation of claim 9 wherein said methacrylate ester monomer is at least one of methylacrylate, ethylacrylate, ethylmethacrylate, isobornyl methacrylate, butylacrylate, octylacrylate, ethyl hexyl acrylates, ethyl hexyl methacrylates, dodecyl methacrylate, and tetrahydrofurfuryl methacrylate.

14. The formulation of claims 9 wherein said adhesion promoter system comprises an adhesion promoter of a phosphate ester, a monofunctional phosphate, a difunctional phosphate, or a combination thereof; and an etching agent of an acid reactive towards a galvanization coating.

15. The formulation of claim 9 further comprising at least one of a chelating agent, corrosion inhibitor, chain transfer agent, pigment, spacer, fragrance, filler, fire retardant, or diluent.

16. The composition of claim 1 wherein the butyl rubber is a poly-isobutylene.

17. A process of applying an adhesive to a substrate comprising:
mixing together the components of claim 1 as a two-part formulation wherein each of said two parts has storage stability at 23° C. for 300 days such that viscosity for after 300 days is within 40% of an initial viscosity;
combining together said two parts to form an adhesive mixture;
applying said adhesive mixture to the substrate;
and allowing said adhesive mixture to cure.

18. The process of claim 17 wherein the weight ratio of adhesive part A to activator part B is 10:1 or 1:1±10%.

19. The process of claim 17 wherein the substrate is a galvanized steel substrate.

20. The process of claim 17 further comprising contacting a second substrate with said mixture during cure to create a bond between the substrate and the second substrate.

21. The process of claim 20 further comprising fixturing the substrate and said second substrate in a joint position and in simultaneous contact with said mixture for a period of time between 5 and 60 minutes during the free-radical cure and then releasing the substrate and the second substrate from the fixture.

* * * * *